United States Patent
Fahn et al.

(10) Patent No.: US 8,340,901 B2
(45) Date of Patent: Dec. 25, 2012

(54) MOBILE ROBOT AND PATH PLANNING METHOD THEREOF FOR MANIPULATING TARGET OBJECTS

(75) Inventors: Chin-Shyurng Fahn, Taipei (TW); Chien-Hsin Wu, Taichung (TW)

(73) Assignee: National Taiwan University of Science and Technology, Taipei (TW)

( * ) Notice: Subject to any disclaimer, the term of this patent is extended or adjusted under 35 U.S.C. 154(b) by 390 days.

(21) Appl. No.: 12/563,165

(22) Filed: Sep. 21, 2009

(65) Prior Publication Data

US 2010/0298977 A1 Nov. 25, 2010

(30) Foreign Application Priority Data

May 20, 2009 (TW) .............................. 98116797 A (51) Int. Cl.
*G06F 19/00* (2006.01)
*G06N 5/02* (2006.01)
(52) U.S. Cl. ........ 701/431; 700/213; 700/245; 348/142; 382/103; 382/153; 382/291
(58) Field of Classification Search ................ 701/201, 701/301, 431, 410; 382/103, 107, 153, 291, 382/276; 318/568.12; 700/246, 213, 245, 700/215; 340/557; 342/118; 348/135, 142
See application file for complete search history.

(56) References Cited

U.S. PATENT DOCUMENTS

| | | | | |
|---|---|---|---|---|
| 6,314,631 | B1 * | 11/2001 | Pryor | 29/407.04 |
| 6,420,698 | B1 * | 7/2002 | Dimsdale | 250/234 |
| 6,456,728 | B1 * | 9/2002 | Doi et al. | 382/103 |
| 6,850,818 | B2 * | 2/2005 | Sabe et al. | 700/257 |
| 7,124,027 | B1 * | 10/2006 | Ernst et al. | 701/301 |
| 7,127,100 | B2 * | 10/2006 | Wenzel et al. | 382/154 |
| 7,202,776 | B2 * | 4/2007 | Breed | 340/435 |
| 7,209,803 | B2 * | 4/2007 | Okamoto et al. | 700/245 |
| 7,269,479 | B2 * | 9/2007 | Okamoto et al. | 700/245 |
| 7,792,606 | B2 * | 9/2010 | Jager | 700/245 |

(Continued)

FOREIGN PATENT DOCUMENTS

WO 02101477 12/2002

(Continued)

OTHER PUBLICATIONS

"First Office Action of China Counterpart Application", issued on Dec. 9, 2011, p. 1-p. 5.

(Continued)

*Primary Examiner* — Ronnie Mancho
(74) *Attorney, Agent, or Firm* — Jianq Chyun IP Office (57) ABSTRACT

A mobile robot and a path planning method are provided for the mobile robot to manipulate the target objects in a space, wherein the space consists of a periphery area and a central area. With the present method, an initial position is defined and the mobile robot is controlled to move within the periphery area from the initial position. Next, the latest image is captured when the mobile robot moves, and a manipulating order is arranged according to the distances estimated between the mobile robot and each of target objects in the image. The mobile robot is controlled to move and perform a manipulating action on each of the target object in the image according to the manipulating order. The steps of obtaining the image, planning the manipulating order, and controlling the mobile robot to perform the manipulating action are repeated until the mobile robot returns to the initial position.

39 Claims, 7 Drawing Sheets

U.S. PATENT DOCUMENTS

| | | | |
|---|---|---|---|
| 8,022,812 B2 * | 9/2011 | Beniyama et al. | 340/10.1 |
| 8,068,935 B2 * | 11/2011 | Kanayama | 700/245 |
| 8,086,551 B2 * | 12/2011 | Czora | 706/46 |
| 8,116,904 B2 * | 2/2012 | Nishiyama | 700/215 |

FOREIGN PATENT DOCUMENTS

| | | |
|---|---|---|
| WO | 2004081683 | 9/2004 |

OTHER PUBLICATIONS

Zheng et al., "Multi-Objective Path Planning Algorithm for Autonomous Ball Picking Robot Based on Visual Information", Jan. 20, 2006, pp. 1-5.

* cited by examiner

MOBILE ROBOT AND PATH PLANNING METHOD THEREOF FOR MANIPULATING TARGET OBJECTS

CROSS-REFERENCE TO RELATED APPLICATION

This application claims the priority benefit of Taiwan application serial no. 98116797, filed on May 20, 2009. The entirety of the above-mentioned patent application is hereby incorporated by reference herein and made a part of specification.

BACKGROUND OF THE INVENTION

1. Field of the Invention

The present invention generally relates to a method of controlling a mobile robot to move, and more particularly, to a method of efficiently planning moving paths of a mobile robot and a mobile robot controlled by virtue of the method.

2. Description of Related Art

Along with the thriving development of science and technology, researches related to all kinds of intelligent robots have been rapidly developed. Wherein, entertainment robots, such electronic pets, can satisfy the requirement of rearing pets for modern life when people are busy. Furthermore, assistant robots have been widely applied in all kinds of fields, such as medical treatment, security service, instrument operation, education, and even victim relieving. Besides, assistant robots for satisfying requirements in modern life are also attracted and desired by people.

For example, assistant robots for cleaning rooms can automatically patrol in rooms and pick up garbage therein while guarding, and assistant robots for picking up balls can help athletes collect the balls that scatter around athletic fields. However, when many kinds of assistant robots work in a space, they may blindly move and simply change their moving directions until colliding with obstacles. In other words, this kind of assistant robots cannot automatically avoid the obstacles and may blindly move to work until finding objects. As a result, it will waste more electric power, and the working efficiency thereof is lower. Moreover, the other kind of assistant robots moves in a space according to fixed predetermined moving paths, and its moving paths are similar to a circle around the space. Accordingly, the assistant robots having fixed predetermined moving paths can not work elastically, so that some areas in the space can not be passed through, but the other areas in the space are repeatedly passed through for many times. As known from the above, regardless of blindly moving or moving according to fixed predetermined moving paths, the working efficiency of the assistant robots is hard to be enhanced while the moving paths do not be planned for manipulating target objects.

SUMMARY OF THE INVENTION

Accordingly, a path planning method for manipulating target objects is provided in an embodiment consistent with the present invention. According to captured images, it controls a mobile robot to efficiently move in a space and manipulate the target objects with the path planning method.

A mobile robot is provided in an embodiment consistent with the present invention. The mobile robot detects target objects to be manipulated by capturing images while moving, so as to plan suitable moving paths.

A path planning method for manipulating target objects is provided in an embodiment consistent with the present invention. The path planning method is adapted to plan the moving paths of a mobile robot to manage the plurality of target objects in a space, wherein the space includes a periphery area and a central area. With the path planning method, an initial position is first defined, and the mobile robot is controlled to move from the initial position in the periphery area, wherein the mobile robot successively captures images while moving. After the latest one of the images captured by the mobile robot is obtained, a manipulating order is planned according to the distances respectively estimated between the target objects and the mobile robot in the image, and the mobile robot is controlled to move according to the manipulating order and perform a manipulating action on the target objects in the image. The steps of obtaining the one of the images, planning the manipulating order, and controlling the mobile robot to perform the manipulating action are repeated until the mobile robot returns to the initial position.

In an embodiment of the present invention, after the mobile robot returns to the initial position, the path planning method includes the following steps. The central area is divided into a plurality of sub-areas, and a traversal order of visiting the sub-areas is defined. Next, the mobile robot is controlled to move into one of the sub-areas according to the traversal order, wherein the mobile robot successively captures images while moving. The latest one of the captured images in a sub-area is obtained. The manipulating order is planned according to the distances respectively estimated between the target objects and the mobile robot in the image. The mobile robot is controlled to move according to the manipulating order and perform the manipulating action on the target objects in the image. The steps of controlling the mobile robot to move into the one of the sub-areas, obtaining the one of the images, planning the manipulating order, and controlling the mobile robot to perform the manipulating action are repeated until the mobile robot has passed through each of the sub-areas.

In an embodiment of the present invention, the target objects are in form of a specific shape, and the step of planning the manipulating order according to the distances respectively estimated between the target objects and the mobile robot in the one of the images includes the following steps. First, the specific shape is searched to obtain at least one candidate object in the image. The distances between each of the candidate objects and the mobile robot are respectively estimated. Next, the candidate objects corresponding to the distances less than or equal to a first threshold are selected as the target objects in the image. The target objects situated at the less distances from the mobile robot are arranged to have prior orders when the manipulating order of managing the target objects is planned.

In an embodiment of the present invention, the step of searching the specific shape to obtain the candidate objects in the image includes the following steps. First, an edge detection operation is performed on the image to extract a plurality of edge features. Next, whether the edge features constitute the specific shape or not is determined to obtain the candidate objects.

In an embodiment of the present invention, after the step of searching the specific shape to obtain the candidate objects in the one of the images, the path planning method further includes the following steps. First, the image is divided into a plurality of sub-image areas, wherein each of the sub-image areas is respectively associated with an orientation directed from the mobile robot. Next, amounts of the candidate objects in each of the sub-image areas are calculated. One of the sub-image areas corresponding to the most one of the amounts is obtained. The orientation associated with the sub-image area covering the most candidate objects is set as a moving direction. In an embodiment of the present invention, the path planning method further includes a step of controlling the mobile robot to move in the moving direction.

In an embodiment of the present invention, the step of estimating the distances respectively between each of the candidate objects and the mobile robot includes a step of estimating the distances respectively between each of the candidate objects and the mobile robot according to sizes of each of the candidate objects in the image.

In an embodiment of the present invention, the step of estimating the distances respectively between each of the candidate objects and the mobile robot includes a step of estimating the distances respectively between each of the candidate objects and the mobile robot according to radii of each of the candidate objects in the image.

In an embodiment of the present invention, after the step of selecting the candidate objects situated at the distances less than or equal to the first threshold as the target objects in the one of the images, the path planning method further includes the following steps. First, the current positions of each of the target objects in the latest one of the captured images and the corresponding previous positions in one of the captured images previous to the latest one of the captured images are obtained. Next, the target objects having displacements, which are the distances between the current positions and the corresponding previous positions, greater than a second threshold are deleted.

In an embodiment of the present invention, the target objects coincide with a specific color, and after the step of selecting the candidate objects situated at the distances less than or equal to the first threshold as the target objects in the image, the path planning method further includes the following steps. First, colors of each of the target objects are obtained. Next, the target objects having the colors, which do not coincide with the specific color, are deleted.

In an embodiment of the present invention, the step of planning the manipulating order according to the distances respectively estimated between the target objects and the mobile robot in the one of the images includes the following steps. First, whether a new target object appears in the latest one of the captured images or not is determined at every predetermined period. Next, the manipulating order is rearranged by considering an added distance between the new target object and the mobile robot if the new target object appears.

In an embodiment of the present invention, when the mobile robot moves in the periphery area, the path planning method further includes the following steps. First, environment information is detected by means of an ultrasonic sensing apparatus. Next, the mobile robot is controlled to move along a border in the space, and keeping the mobile robot a predetermined distance away from the border according to the environment information.

In an embodiment of the present invention, the path planning method further includes the following steps. First, a plurality of edge features is obtained in the image. Next, it is determined that static obstacles exist in positions of each of the edge features when each of the edge features constitutes a straight line having a slope of 90 degrees or substantially 90 degrees. The mobile robot is controlled to avoid the static obstacles when the mobile robot moves.

In an embodiment of the present invention, the path planning method further includes the following steps. First, a moving velocity of an object is estimated according to a position of the object in the latest one of the captured images and a position of the object in one of the captured images previous to the latest one of the captured images. Next, it is determined that the object is a dynamic obstacle when the moving velocity is greater than a third threshold. The mobile robot is controlled to avoid the dynamic obstacle when the mobile robot approaches to the dynamic obstacle.

In an embodiment of the present invention, when the mobile robot moves in the periphery area, the path planning method further includes the following steps. The mobile robot is controlled to move toward a border then along the border. Meanwhile, the mobile robot is kept a predetermined distance away from the border when the mobile robot moves in the periphery area and deviates a distance greater than a fourth threshold from the border in the space. Wherein, the fourth threshold is greater than the predetermined distance.

A mobile robot is provided in an embodiment consistent with the present invention. The mobile robot comprises a driving apparatus, an image capturing apparatus, a target object manipulating apparatus, and a control module. Wherein, the driving apparatus steers the mobile robot to move. The image capturing apparatus successively acquires images when the mobile robot moves. The target object manipulating apparatus manages a plurality of target objects in a space, wherein the space includes a periphery area and a central area. The control module is coupled to the image capturing apparatus, the driving apparatus, and the target object manipulating apparatus, so as to enable the driving apparatus to steer the mobile robot to move from the initial position in the periphery area and obtain the latest one of the images acquired by the image capturing apparatus. Next, the control module plans a manipulating order according to the distances respectively estimated between the target objects and the mobile robot in the image, enables the driving apparatus to steer the mobile robot to move according to the manipulating order, and activates the target object manipulating apparatus to perform a manipulating action on the target objects in the image. The control module repeats the procedures of obtaining one of the images, planning the manipulating order, activating the target object manipulating apparatus to perform the manipulating action until the mobile robot returns to the initial position.

In an embodiment of the present invention, the control module divides the central area into a plurality of sub-areas after the mobile robot returns to the initial position, and the control module defines a traversal order of visiting the sub-areas. The control module enables the driving apparatus to steer the mobile robot to move into one of the sub-areas according to the traversal order, obtains the latest one of the images acquired by the image capturing apparatus in the sub-area, and plans the manipulating order according to the distances respectively estimated between the target objects and the mobile robot in the image. The control module repeats the procedures of enabling the driving apparatus to steer the mobile robot to move into the sub-area, obtaining the image, planning the manipulating order, and activating the target object manipulating apparatus to perform the manipulating action until the mobile robot has passed through each of the sub-areas.

In an embodiment of the present invention, the target objects are in form of a specific shape, and the control module searches the specific shape to obtain at least one candidate object in the images. Next, the control module estimates the distances respectively between each of the candidate objects and the mobile robot, and selects the candidate objects situated at the distances less than or equal to a first threshold as the target objects in the image. The control module plans the target objects situated at the shorter distances from the mobile robot to have prior orders when planning the manipulating order of managing the target objects.

In an embodiment of the present invention, the control module performs an edge detection operation on the image to extract a plurality of edge features, and determines whether the edge features constitute the specific shape or not to obtain the candidate objects.

In an embodiment of the present invention, the control module divides the image into a plurality of sub-image areas, wherein each of the sub-image areas is respectively associated with an orientation directed from the mobile robot. The control module calculates amounts of the candidate objects located in each of the sub-image areas, then obtains one of the sub-image areas corresponding to the most one of the amounts, and sets the orientation associated with the obtained sub-image area as a moving direction. In an embodiment of the present invention, the control module enables the driving apparatus to steer the mobile robot to move in the moving direction.

In an embodiment of the present invention, the control module estimates the distances respectively between each of the candidate objects and the mobile robot according to the sizes of each of the candidate objects in the image.

In an embodiment of the present invention, the control module estimates the distances respectively between each of the candidate objects and the mobile robot according to radii of each of the candidate objects in the image.

In an embodiment of the present invention, the control module obtains the current positions of each of the target objects in the latest one of the captured images and the corresponding previous positions in one of the captured images previous to the latest one of the captured images, and deletes the target objects having displacements, which are the distances between the current positions and the corresponding previous positions, greater than a second threshold.

In an embodiment of the present invention, the target objects coincide with a specific color, and the control module obtains the colors of each of the target objects and deletes the target objects having the colors, which do not coincide with the specific color.

In an embodiment of the present invention, the control module determines whether a new target object appears in the latest one of the captured images or not at every predetermined period. If the new target object appears, the control module rearranges the manipulating order according to a distance between the new target object and the mobile robot.

In an embodiment of the present invention, the mobile robot further includes an ultrasonic sensing apparatus coupled to the control module to detect environment information. Wherein, the control module enables the driving apparatus to steer the mobile robot to move along a border in the space and keep the mobile robot a predetermined distance away from the border according to the environment information.

In an embodiment of the present invention, the control module obtains a plurality of edge features in the image and determines that static obstacles exist in the positions of each of the edge features when each of the edge features constitutes a straight line having a slope of 90 degrees or substantially 90 degrees. Accordingly, the control module enables the driving apparatus to steer the mobile robot to avoid the static obstacles when the driving apparatus steers the mobile robot.

In an embodiment of the present invention, the control module estimates a moving velocity of an object according to a position of the object in the latest one of the captured images and a position of the object in one of the captured images previous to the latest one of the captured images. The control module determines that the object is a dynamic obstacle when the moving velocity is greater than a third threshold. Accordingly, the control module enables the driving apparatus to steer the mobile robot to avoid the dynamic obstacle when the mobile robot approaches to the dynamic obstacle.

In an embodiment of the present invention, the control module enables the driving apparatus to steer the mobile robot to move toward a border then along the border, and keeps the mobile robot a predetermined distance away from the border when the mobile robot moves in the periphery area and deviates a distance greater than a fourth threshold from the border in the space, wherein the fourth threshold is greater than the predetermined distance.

In an embodiment of the present invention, the mobile robot further includes a body. The body comprises a chamber and an outlet, wherein the outlet is linked to the chamber.

In an embodiment of the present invention, the driving apparatus includes a first wheel set and a second wheel set. An axis of the first wheel set is fixed in the body and rotates back and forth about a first axis as an axle center, and an axis of the second wheel set is fixed in the body and rotates left and right about a second axis as an axle center, wherein the first axis and the second axis are substantially perpendicular to each other.

In an embodiment of the present invention, the first wheel set includes a first wheel and a second wheel, and drives the mobile robot to move in a straight line. The first wheel and the second wheel are parallel to each other and rotate about the first axis as the axle center.

In an embodiment of the present invention, the second wheel set is a directional wheel, an axis of the directional wheel is fixed in the body through a connector, and the directional wheel rotates left and right about the second axis as the axle center to drive the mobile robot to turn.

In an embodiment of the present invention, the target object manipulating apparatus includes a third wheel. An axis of the third wheel is fixed in the body, and the third wheel has a plurality of fans stretching in a radial direction of a third axis.

In an embodiment of the present invention, the body further includes a guiding component, and the guiding component covers a part of the third wheel. The target object manipulating apparatus conducts the target objects through the guiding component to the chamber by virtue of the fans turned with the third wheel when manipulating the target objects.

In an embodiment of the present invention, the first wheel set is located between the third wheel and the second wheel set, and the second wheel set is located between the first wheel set and the outlet. The radii of the first wheel and the second wheel in the first wheel set are greater than the radius of the directional wheel in the second wheel set.

In view of the above, the mobile robot dynamically detects the target objects in the space according to the captured images while moving, estimates the distances respectively between each of the target objects and the mobile robot, and further, plans the most efficient moving path for manipulating the target objects. Accordingly, the mobile robot can refrain from blindly moving in the space, so as to finish manipulating the target objects rapidly.

To make the aforementioned and other features as well as the advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
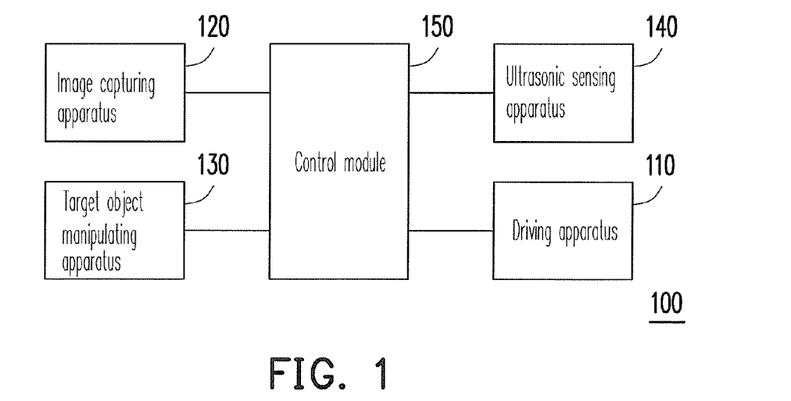
FIG. 1 is a block diagram of a mobile robot according to an embodiment consistent with the present invention.

FIG. 1 is a block diagram of a mobile robot according to an embodiment consistent with the present invention. Referring to FIG. 1, the mobile robot 100 comprises a driving apparatus 110, an image capturing apparatus 120, a target object manipulating apparatus 130, an ultrasonic sensing apparatus 140, and a control module 150. Wherein, the driving apparatus 110 comprises a wheel set for driving the mobile robot 100 to straight move, a wheel set for driving the mobile robot 100 to turn, and a motor for controlling rotational speeds thereof. The image capturing apparatus 120, for example, is a webcam, and a turning angle thereof can be adjusted. Moreover, the image capturing apparatus 120 successively acquires images when the mobile robot 100 moves.

The target object manipulating apparatus 130 is used to manage a plurality of target objects in a space when the mobile robot 100 moves in the space. Wherein, the space may be a room or a court, but the present invention is not limited thereto, and the space is divided into a periphery area and a central area. The ultrasonic sensing apparatus 140 is used to detect environment information surrounding to the mobile robot 100.

The control module 150 is coupled to the driving apparatus 110, the image capturing apparatus 120, the target object manipulating apparatus 130, and the ultrasonic sensing apparatus 140. Using the images acquired by the image capturing apparatus 120, the control module 150 detects the target objects to be manipulated and plans a manipulating order. Moreover, the control module 150 enables the driving apparatus 110 to steer the mobile robot 100 to move in the space according to dynamically planned moving paths, so that the mobile robot 100 approaches to the target objects, and further, the target object manipulating apparatus 130 performs a manipulating action on the target objects. In other words, when the mobile robot 100 moves in the space and tries to manipulate the target objects, the control module 150 dynamically plans the moving paths for manipulating the target objects according to the images acquired by the image capturing apparatus 120 and kinds of the target objects. Wherein, the control module 150, for example, is a piece of hardware having the capability of information processing, such as a microprocessor or a chipset, a software component, or a combination thereof, but the present invention is not limit thereto. Accordingly, the mobile robot 100 finishes manipulating the target objects more efficiently. For instance, the function of planning the moving paths is realized by use of the microprocessor or the chipset, and the microprocessor or the chipset enables the driving apparatus 110 to steer the mobile robot 100 and activates the target object manipulating apparatus 130 to perform the manipulating action via the corresponding hardware controlling instructions. Furthermore, when the function of planning the moving paths is provided by the software component, the software component may be installed in a notebook computer. The notebook computer sends the hardware controlling instructions for the driving apparatus 110 and the target object manipulating apparatus 130 to the microprocessor through Bluetooth, RS-232 connectors, or universal serial bus (USB), and further, the microprocessor enables the driving apparatus 110 and activates the target object manipulating apparatus 130 to work.

Figure 2:
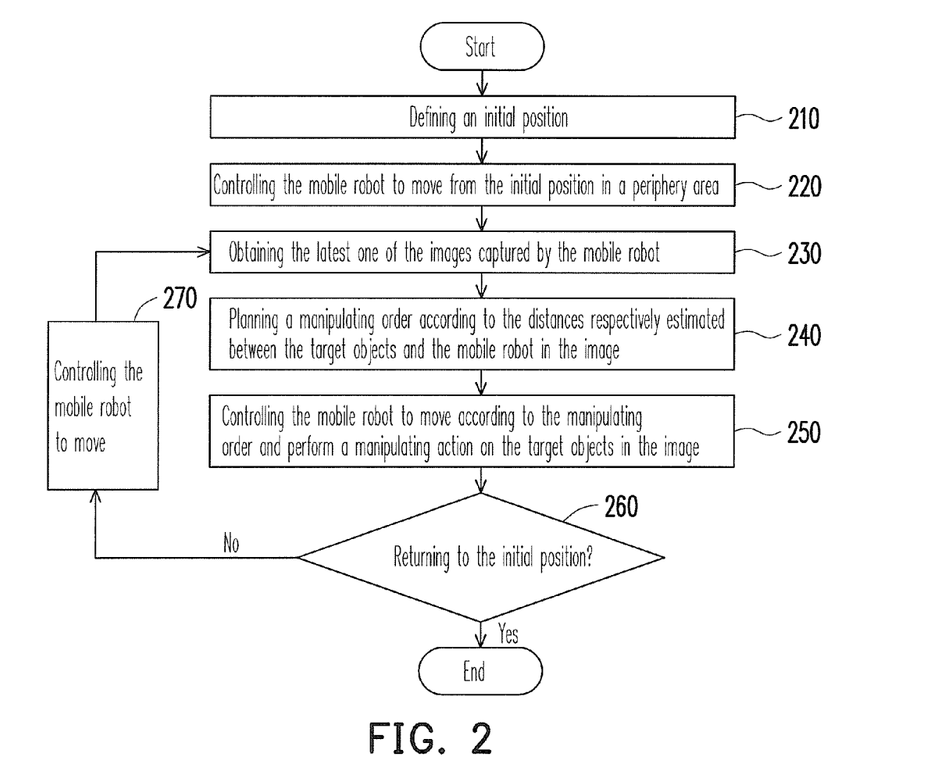
FIG. 2 is a flowchart of a path planning method for manipulating target objects according to another embodiment consistent with the present invention.

Components inside the mobile robot 100 and the operation of the control module 150 will be described in detail as follows. FIG. 2 is a flowchart of a path planning method for manipulating target objects according to an embodiment consistent with the present invention. Referring to FIG. 1 and FIG. 2, first of all, the control module 150 defines an initial position, such as a corner in the space or a position where the mobile robot 100 currently stays, as shown in Step 210.

Next, in Step 220, the control module 150 enables the driving apparatus 110 to steer the mobile robot 100 to move from the initial position in a periphery area in the space. When the mobile robot 100 moves, the image capturing apparatus 120 successively acquires images, wherein the images acquired by the image capturing apparatus 120, for example, are scenes in front of the mobile robot 100.

Thereafter, the control module 150 obtains the latest one of the images acquired by the image capturing apparatus 120, as shown in Step 230, and in Step 240, the control module 150 plans the manipulating order according to the distances respectively estimated between the target objects and the mobile robot 100 in the latest image. In the present embodiment, it is first required to detect positions of the target objects in the latest image when the control module 150 plans the manipulating order using the images. Steps of planning the manipulating order will be further described in detail with reference to FIG. 3 as follows.

Figure 3:
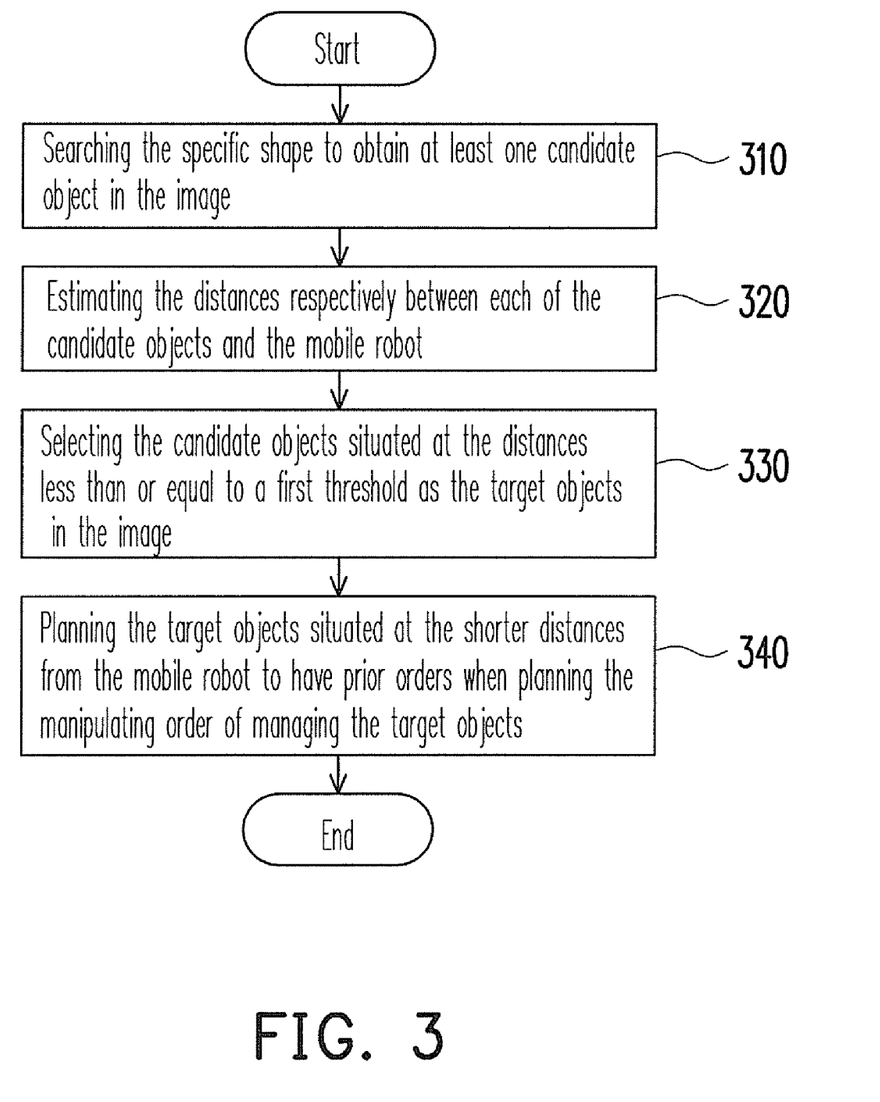
FIG. 3 is a flowchart of planning the manipulating order according to an embodiment of the present invention.

Referring to FIG. 3, in the present embodiment, if the target objects are in form of a specific shape, such as a circle or a square, but the present invention is not limited thereto, the control module 150 first searches the specific shape to obtain at least one candidate object in the captured image in Step 310. For example, the control module 150 performs an edge detection operation on the image to extract a plurality of edge features therein, wherein the edge detection operation, for instance, is to adopt the Sobel operator, but it does not limit the scope of the present invention. After extracting the edge features, the control module 150 determines whether the edge features constitute the specific shape or not to obtain the candidate objects. In an embodiment, the control module 150 may further detect the candidate objects overlapping each other in the image by means of image processing techniques, computer vision techniques, and the like. For example, when the specific shape is designated a circle, the control module 150 may detect the overlapping circles in the image with a stochastic circle detection method.

In the present embodiment, after obtaining the candidate objects, the control module 150 divides the image into a plurality of sub-image areas, and determines that which one of the sub-image areas has the most candidate objects, wherein each of the sub-image areas is respectively associated with an orientation directed from the mobile robot, such as the front, the left, and the right. The control module 150 calculates the amounts of the candidate objects in each of the sub-image areas, obtains one of the sub-image areas corresponding to the most one of the amounts, and sets the orientation associated with the sub-image area covering the most candidate objects as a moving direction. Accordingly, the control module 150 enables the driving apparatus 110 to steer the mobile robot 100 to move in the moving direction.

After obtaining the candidate objects, the control module 150 estimates the distances respectively between each of the candidate objects and the mobile robot 100, as shown in Step 320. Since it is for the same kind of the target objects in the present embodiment, if the target objects have the same volume, the greater volume the candidate object has in the image, the shorter distance the candidate object is situated at from the mobile robot 100. Accordingly, the control module 150, for example, estimates the distances respectively between each of the candidate objects and the mobile robot 100 according to the sizes of each of the candidate objects in the image. When the specific shape is in form of a circle, the control module 150 estimates the distances respectively between each of the candidate objects and the mobile robot 100 according to the radii of each of the candidate objects in the image, wherein the longer radius the candidate object has in the image, the shorter distance the candidate object is situated at from the mobile robot 100.

In the present embodiment, the candidate objects are in form of the specific shape in the image may be the target objects to be manipulated by the mobile robot 100. However, when the target objects are too far away from the mobile robot 100, the mobile robot 100 can not immediately manipulate them. Accordingly, in Step 330, the mobile robot 100 selects the candidate objects situated at the distances less than or equal to a first threshold as the target objects in the image.

In another embodiment, the control module 150 may further determine whether the moving target objects can be manipulated by the mobile robot 100 according to the plurality of images captured before and after. Wherein, the control module 150 obtains the current positions of each of the target objects in the latest one of the captured images and the corresponding previous positions in one of the captured images previous to the latest one of the captured images. If a displacement between the current position and the previous position both corresponding to the same target object is greater than a second threshold, it means that the above-described target object moves highly fast and may quickly pass through the area in which the mobile robot 100 can manipulate it. As a result, the mobile robot 100 can not manipulate the above-described target object. Accordingly, the control module 150 deletes the target objects having the displacements greater than the second threshold. On the contrary, if the same target object appears in neighboring positions in the images captured before and after, the control module 150 determines that the above-described target object is static or substantially static, so that the mobile robot 100 can manipulate the above-described target object.

In another embodiment, in order to further ensure that the detected target objects are the objects which the mobile robot 100 wants to manipulate, when the target objects coincide with a specific color, the control module 150 obtains the colors of each of the target objects and deletes the target objects having the colors which do not coincide with the specific color.

Through the above-described steps, the control module 150 can not only detect each of the target objects consistent with the objects manipulated by the mobile robot 100 in the image, but also determine the positions of the target objects.

Finally, when planning the manipulating order of managing the target objects, the control module 150 plans the target objects situated at the shorter distances from the mobile robot 100 to have prior orders, as shown in Step 340. That is, the shorter distance the target object is situated at from the mobile robot 100, the earlier the target object is manipulated by the mobile robot 100.

It should be noted that, the control module 150 determines whether a new target object appears in the latest one of the captured images or not at every predetermined period. If the new target object appears, the control module 150 rearranges the manipulating order according to a distance between the new target object and the mobile robot. In consequence, so long as the new target object enters in the space, the mobile robot 100 can also consider it to plan the manipulating order immediately and then manipulates it.

FIG. 3 illustrates how the control module 150 detects the target objects in the image and plans the manipulating order of managing each of the target objects. Next, returning to Step 250 in FIG. 2, the control module 150 enables the driving apparatus 110 to steer the mobile robot 100 to move according to the manipulating order, and activates the target object manipulating apparatus 130 to sequentially perform the manipulating action on the target objects in the image. For example, since the control module 150 has obtained the positions of each of the target objects, the control module 150 can enable the driving apparatus 110 to change the moving direction and the moving speed of the mobile robot 100 to approaches to the target objects, duly turn on the target object manipulating apparatus 130, and turn off the target object manipulating apparatus 130 after it finishes the manipulating action.

Figure 8:
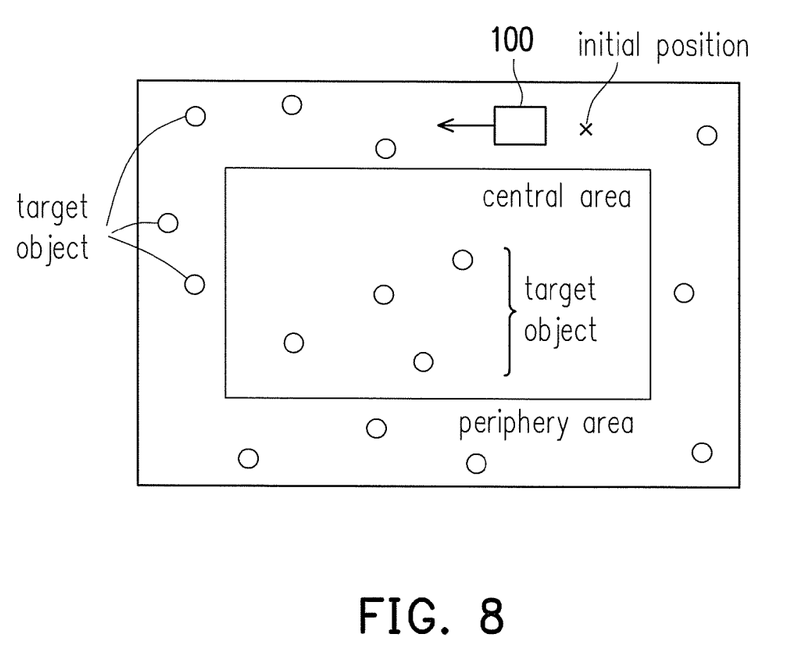
FIG. 8 is schematic diagram illustrating the moving of a mobile robot from a periphery area to a central area according to an embodiment consistent with the present invention.

Next, the control module 150 determines whether the mobile robot 100 already returns to the initial position or not in Step 260. If the mobile robot 100 already returns to the initial position, it means that the mobile robot 100 finishes the manipulating action in the periphery area, and the processing procedure in the present embodiment goes to the end. Conversely, if the mobile robot 100 does not return to the initial position yet, the control module 150 still enables the driving apparatus 110 to steer the mobile robot 100 to move in the periphery area, as shown in Step 270. The control module 150 repeats Steps 230 through 260 until the mobile robot 100 returns to the initial position. In steps as shown in FIG. 2, when managing the plurality of target objects, the mobile robot 100 no longer moves blindly and inefficiently, but it moves around the space; that is, the periphery area, according to the manipulating order instead (as shown in FIG. 8). When returning to the initial position, the mobile robot 100 has finished the manipulating action performing on all of the target objects scattering around the space.

It should be noted that, when the mobile robot 100 moves in the periphery area, the control module 150 enables the driving apparatus 110 to steer the mobile robot 100 to move along borders in the space, such as walls around a house, and keeps the mobile robot 100 a predetermined distance away from the borders according to the environment information detected by the ultrasonic sensing apparatus 140. Once the mobile robot 100 deviates a distance greater than a fourth threshold from the borders in the space while performing the manipulating action, the control module 150 enables the driving apparatus 110 to steer the mobile robot 100 to move toward one of the borders then along the border, and meanwhile, keeps the mobile robot 100 the predetermined distance away from the border, wherein the fourth threshold is greater than the predetermined distance.

Figure 4:
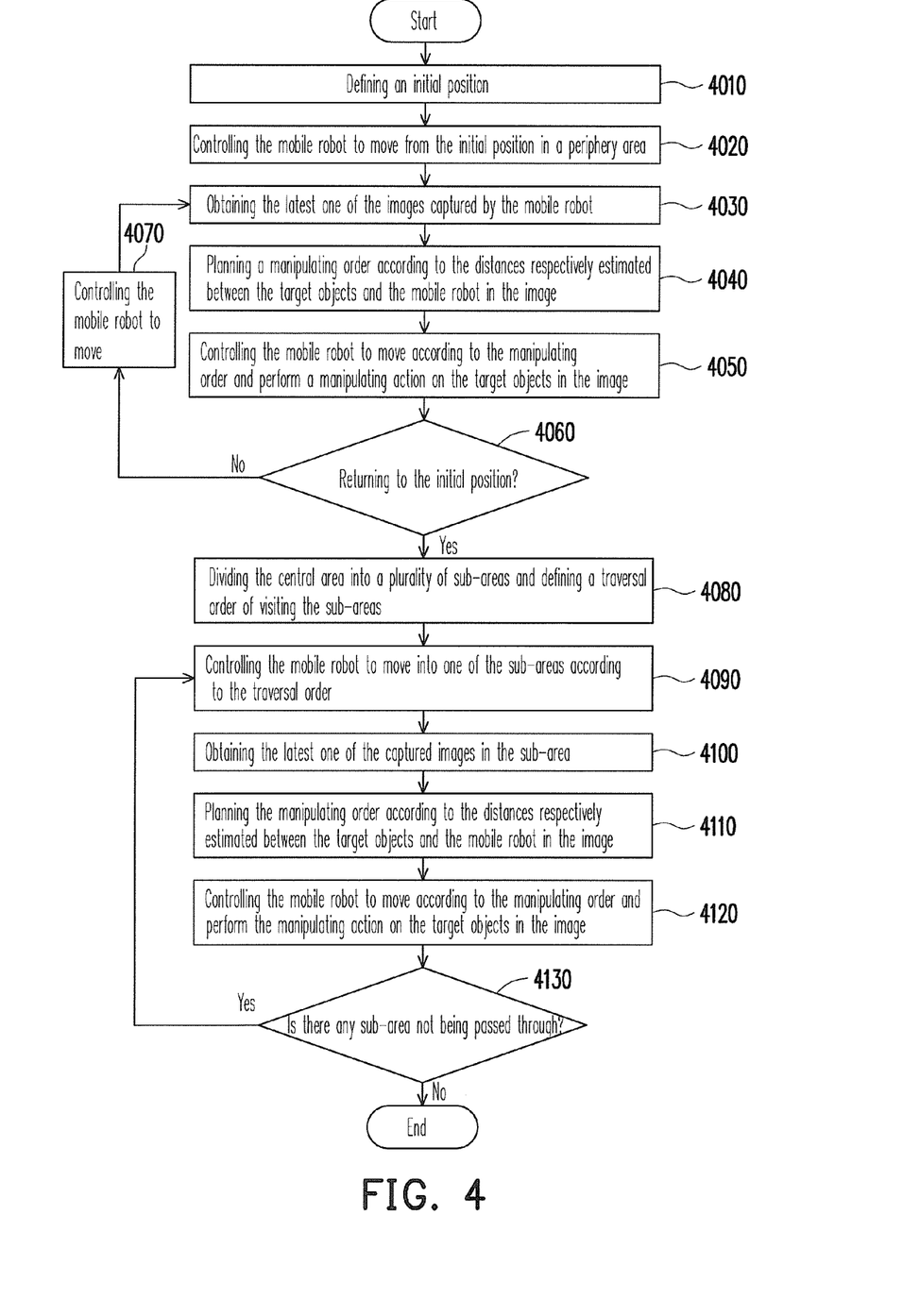
FIG. 4 is a flowchart of a path planning method for manipulating target objects according to another embodiment consistent with the present invention.

In another embodiment consistent with the present invention, besides the mobile robot 100 manipulates the target objects in the periphery area of the space, after finishing manipulating the target objects in the periphery area and returning to the initial position, the mobile robot 100 further detects the target objects in the central area, plans the manipulating order, and performs the manipulating action on the above-described target objects according to the manipulating order. FIG. 4 is a flowchart of a path planning method for manipulating target objects according to another embodiment consistent with the present invention. In the present embodiment, Steps 4010 through 4070 shown in FIG. 4 are the same as or similar to Steps 210 through 270 shown in FIG. 2, and it will not described again herein. The steps will be described in detail as follows after the mobile robot 100 has finished the manipulating action in the periphery area and returned to the initial position.

As shown in Step 4080, after the mobile robot 100 returns to the initial position, the control module 150 divides the central area into a plurality of sub-areas and defines a traversal order of visiting the above-described sub-areas. Wherein, the control module 150, for example, faces a predetermined orientation to scan the central area, and while scanning, the control module 150 divides the central area into one of the sub-areas once an obstacle is scanned. When planning the traversal order, the control module 150 refrains from planning the mobile robot 100 to repeatedly pass through the same sub-area and to make a detour.

Next, the control module 150 obtains one of the sub-areas where the mobile robot 100 does not enter yet and has priority to enter at present according to the traversal order and enables the driving apparatus 110 to steer the mobile robot 100 to enter into the above-described sub-area. Since the image capturing apparatus 120 successively acquires the images, the control module 150 can obtains the latest one of the images acquired by the image capturing apparatus 120 in the sub-area where the mobile robot 100 enters, as shown in Step 4100. Next, in Step 4110, the control module 150 plans the manipulating order for the target objects in the sub-areas according to the distances respectively estimated between the target objects and the mobile robot 100 in the image, enables the driving apparatus 110 to steer the mobile robot 100 to move in the sub-areas according to the traversal order, and activates the target object manipulating apparatus 130 to perform the manipulating action on the target objects in the image, as shown in Step 4120. Since Steps 4100 through 4120 in the present embodiment are the same as or similar to those in the above-described embodiment, it will not described again herein.

Finally, in Step 4130, the control module 150 determines whether there is any sub-area not being passed through. If there exists, the processing procedure of the path planning method in the present embodiment should return to Step 4090, and the control module 150 conducts the mobile robot 100 to enter into another one of the sub-areas according to the traversal order. As a result, the control module 150 repeats Steps 4100 through 4130 until the mobile robot 100 sequentially passes through all of the sub-areas in the central area.

As shown in FIG. 4, when the mobile robot 100 intends to manipulate the specific target objects in the space, the mobile robot 100 first searches the specific target objects in the periphery area of the space, then detects the specific target objects, and plans the manipulating order by successively capturing the images. After finishing manipulating all the target objects in the periphery area, the mobile robot 100 moves toward the central area of the space. Next, the mobile robot 100 sequentially passes through each of the sub-areas generated from dividing the central area according to the specific traversal order, and similarly, the mobile robot 100 plans the manipulating order and detects the specific target objects in each of the sub-areas by successively capturing the images. The mobile robot 100 sequentially manipulates the specific target objects in each of the sub-areas one by one, and further, finishes manipulating all of the specific target objects in the space.

The strategy of the path planning method is that when manipulating the target objects scattering in the space, the mobile robot 100 first moves around the space; that is, the periphery area, and meanwhile, performs the manipulating action on all of the target objects until it returns to the initial position according to the control module 150. After that, the mobile robot 100 sequentially passes through each of the sub-areas of the central area according to the traversal order planned by the control module 150, and manipulates the target objects in each of the sub-areas. Through planning the moving path and the manipulating order, the mobile robot 100 does not blindly move in the space via consuming unnecessary time and electric power but efficiently approaches to the target objects, so that the efficiency of manipulating the target objects is enhanced.

With the path planning methods for manipulating the target objects shown in FIG. 2 and FIG. 4, the control module 150 directs the mobile robot 100 to refrain from colliding with the borders in the space, such as walls and obstacles. Furthermore, the control module 150 obtains a plurality of edge features in the image and determines that the static obstacles exist in the positions of the edge features when the edge features constitute a straight line having a slope of 90 degrees or substantially 90 degrees. Accordingly, the control module 150 enables the driving apparatus 110 to steer the mobile robot 100 to automatically avoid the static obstacles when the driving apparatus 110 steers the mobile robot 100. Moreover, if a position of an object in the latest one of the captured images is much different from a position of the object in one of the captured images previous to the latest one of the captured images, it means that a moving velocity of the object is fast. In consequence, the control module 150 determines that the object is a dynamic obstacle when the moving velocity is greater than a third threshold, for example, set to a moving velocity of the mobile robot 100. The control module 150 enables the driving apparatus 110 to steer the mobile robot 100 to automatically avoid the dynamic obstacle when the mobile robot 100 approaches to the dynamic obstacle. For this reason, even if any of the dynamic or static obstacles exist in the space, the mobile robot 100 still successfully moves forward without colliding with them.

Figure 5:
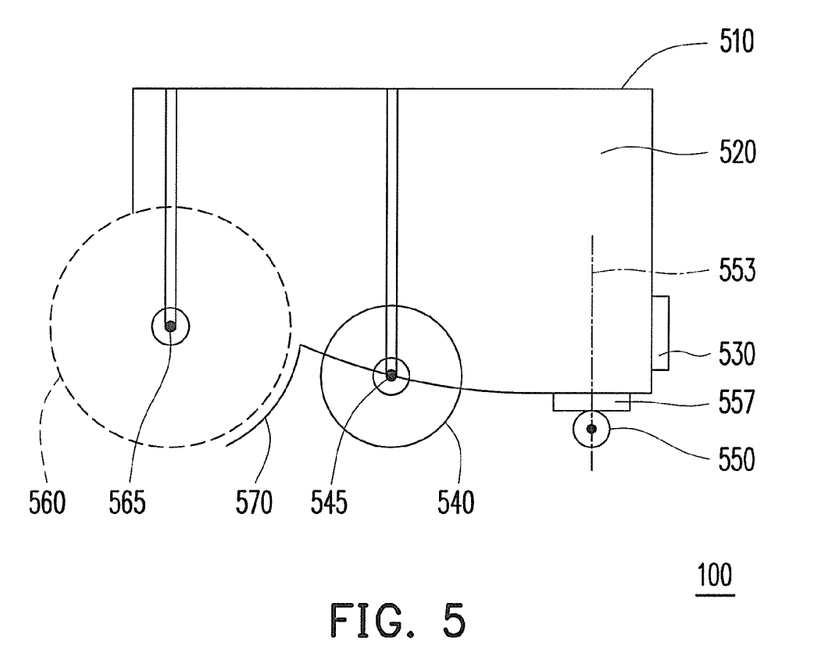
FIG. 5 is a lateral view of a mobile robot according to an embodiment consistent with the present invention.

FIG. 5 is a lateral view of a mobile robot 100 according to an embodiment consistent with the present invention. Referring to FIG. 1 and FIG. 5, the mobile robot 100 includes a body 510, wherein the body 510 comprises a chamber 520 and an outlet 530 linked to each other. In the present embodiment, the driving apparatus 110 includes a first wheel set and a second wheel set, wherein an axis of the first wheel set is fixed in the body 510, and the first wheel set rotates back and forth about a first axis 545 as an axle center. The first wheel set consists of a first wheel 540 and a second wheel (not shown) which are parallel to each other and rotate about the first axis as the axle center, wherein the second wheel (not shown) is fixed on the other side of the mobile robot 100. That is, the first wheel 540 and the second wheel (not shown) both have the same axle center and are parallel to each other. The first wheel set is used to drive the mobile robot 100 to move in a straight line, and an axis of the second wheel set is also fixed in the body 510 and rotates left and right about a second axis 553 as an axle center. In the present embodiment, the second wheel set is a directional wheel 550 of which the axis is set in the body 510 through a connector 557. Furthermore, the directional wheel 550 rotates left and right about the second axis 553 as the axle center to drive the mobile robot 110 to turn, wherein the first axis 545 and the second axis 553 are substantially perpendicular to each other. The mobile robot 100 is steered to change the moving directions thereof by the single directional wheel 550 and controlled to change the moving velocity thereof by the first wheel 540 and the second wheel (not shown) both having the same axle center and parallel to each other in the present embodiment. From the above, not only the design of the mobile robot 100 is simple, but also the mobile robot 100 certainly moves in a straight line.

Figure 6:
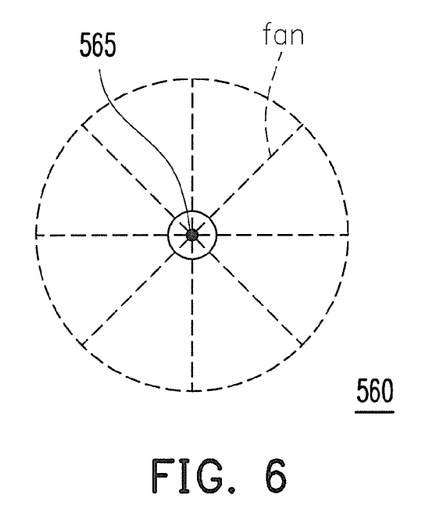
FIG. 6 is a schematic view of the third wheel according to an embodiment consistent with the present invention.
Figure 7A:
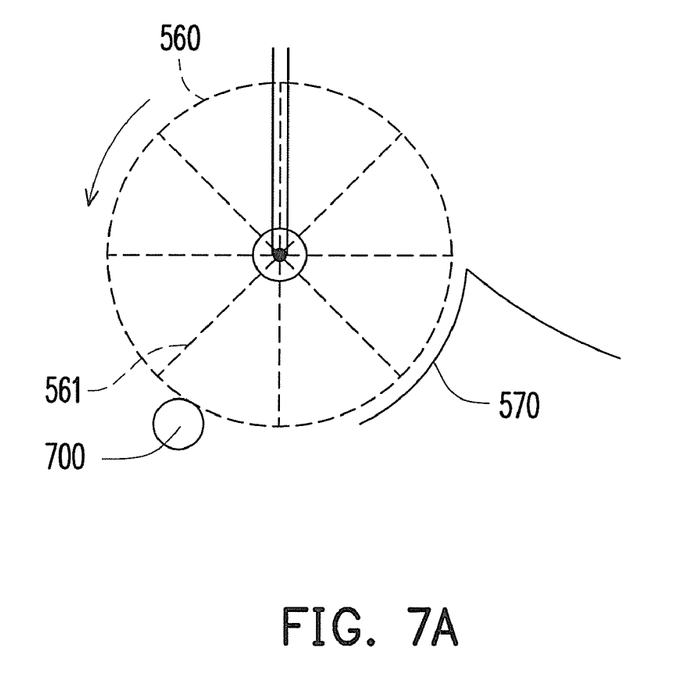
FIG. 7A through FIG. 7D are schematic views of the target objects collected to the chamber by the third wheel according to an embodiment consistent with the present invention.
Figure 7B:
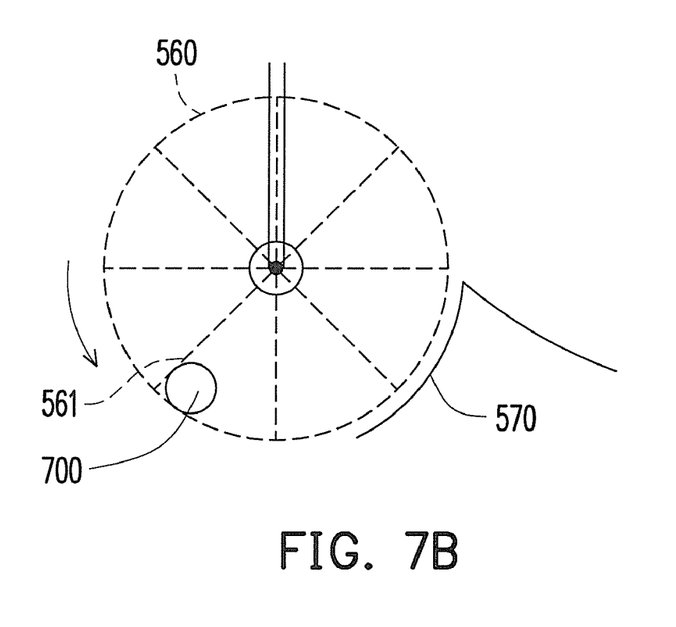
Figure 7C:
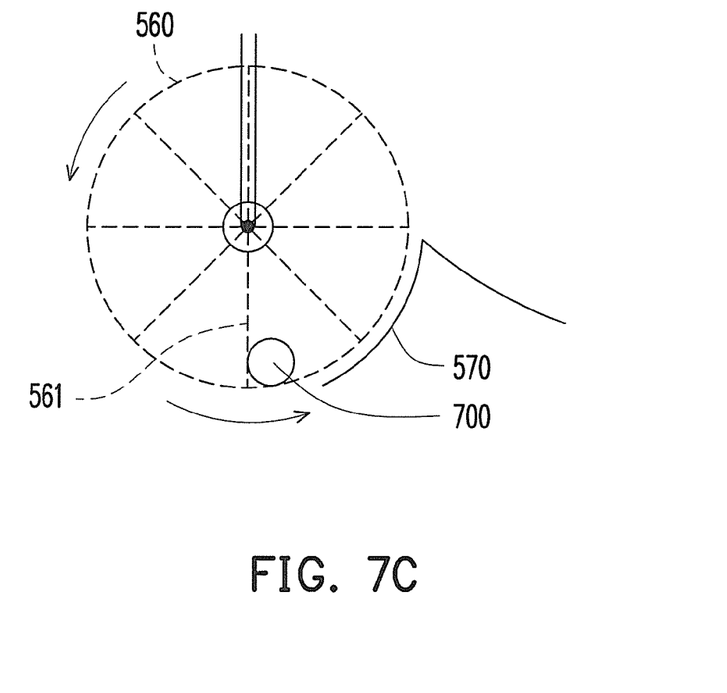
Figure 7D:
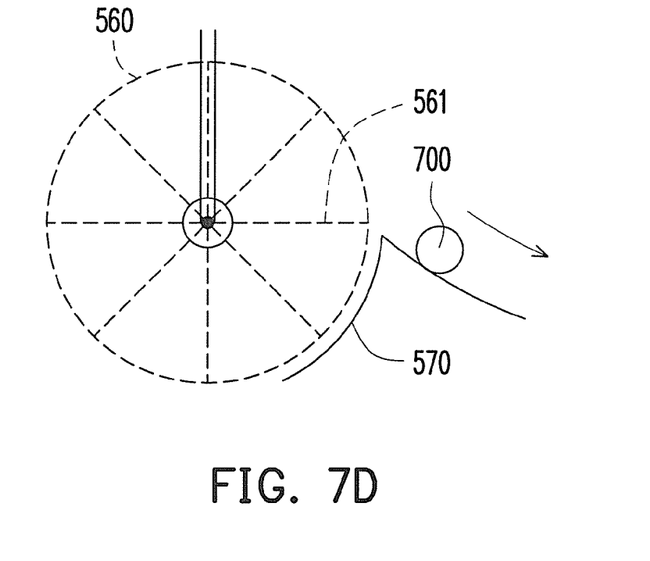

In the present embodiment, the target object manipulating apparatus 130 includes a third wheel 560. An axis of the third wheel 560 is fixed in the body 510, as shown in FIG. 6, and has a plurality of fans stretching in a radial direction of a third axis 565. In this embodiment, the third wheel 560 has eight fans. The body 510 further includes a guiding component 570, and the guiding component 570 covers a part of the third wheel 560. When manipulating the target objects according to the control module 150, the target object manipulating apparatus 130, for example, conducts the target objects through the guiding component 570 to the chamber 520 by virtue of the fans turned with the third wheel 560. Since the first wheel set is located between the third wheel 560 and the second wheel set, the second wheel set is located between the first wheel set and the outlet 530, and radii of the first wheel 540 and the second wheel (not shown) in the first wheel set are greater than the radius of the directional wheel in the second wheel set, the target objects collected by the mobile robot 100 can roll into the chamber 520 and thus stay there. Accordingly, users take the target objects collected by the mobile robot 100 out from the outlet 530. FIG. 7A through FIG. 7D are the schematic views of the target objects collected to the chamber 520 by the third wheel 560 according to an embodiment consistent with the present invention. For instance, if the target object manipulated by the mobile robot 100 is a ping-pong ball, FIG. 7A shows that the mobile robot 100 approaches to the ping-pong ball 700. Next, in FIG. 7B, the third wheel 560 driven by the control module 150 takes the ping-pong ball 700. The ping-pong ball 700 is further conducted through the guiding component 570 by virtue of the fan 561 turned with the third wheel 560, as shown in FIG. 7C. Finally, the ping-pong ball 700 is collected into the chamber 520 as FIG. 7D shows.

To sum up, the path planning method for manipulating the target objects provided in an embodiment consistent with the present invention is depicted as follows. The target objects are detected by analyzing the captured images when the mobile robot moves, and the manipulating order is planned. When moving according to the manipulating order dynamically planned, the mobile robot automatically avoids the dynamic and static obstacles, and further, finishes manipulating the target objects quickly and efficiently.

Although the present invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A path planning method for manipulating target objects, adapted to plan moving paths of a mobile robot to manage the plurality of target objects in a space, wherein the space comprises a periphery area and a central area, the path planning method comprising:
    defining an initial position;
    controlling the mobile robot to move from the initial position in the periphery area, wherein the mobile robot successively captures images while moving;
    obtaining a latest one of the images captured by the mobile robot;
    planning a manipulating order according to distances respectively estimated between the target objects and the mobile robot in the latest one of the images;
    controlling the mobile robot to move according to the manipulating order and perform a manipulating action on the target objects in the one of the images, wherein the manipulating action is approaching and collecting one of the target objects;
    repeating the steps of obtaining the latest one of the images, planning the manipulating order, and controlling the mobile robot to perform the manipulating action until the mobile robot returns to the initial position; and
    controlling the mobile robot to move to the central area and perform the manipulating action on the target objects in the central area.

2. The path planning method as claimed in claim 1, wherein the step of controlling the mobile robot to move to the central area, and perform the manipulating action on the target objects in the central area further includes:
    dividing the central area into a plurality of sub-areas, and defining a traversal order of visiting the sub-areas;
    controlling the mobile robot to move into one of the sub-areas according to the traversal order, wherein the mobile robot successively captures images while moving;
    obtaining a latest one of the captured images in the one of the sub-areas;
    planning the manipulating order according to the distances respectively estimated between the target objects and the mobile robot in the one of the images;
    controlling the mobile robot to move according to the manipulating order and perform the manipulating action on the target objects in the one of the images; and
    repeating the steps of controlling the mobile robot to move into the one of the sub-areas, obtaining the one of the images, planning the manipulating order, and controlling the mobile robot to perform the manipulating action until the mobile robot has passed through each of the sub-areas.

3. The path planning method as claimed in claim 1, wherein the target objects are in form of a specific shape, and the step of planning the manipulating order according to the distances respectively estimated between the target objects and the mobile robot in the one of the images includes:
    searching the specific shape to obtain at least one candidate object in the one of the images;
    estimating the distances respectively between each of the candidate objects and the mobile robot;
    selecting the candidate objects situated at the distances less than or equal to a first threshold as the target objects in the one of the images; and
    planning the target objects situated at the shorter distances from the mobile robot to have prior orders when planning the manipulating order of managing the target objects.

4. The path planning method as claimed in claim 3, wherein the step of searching the specific shape to obtain the candidate objects in the one of the images comprises:

performing an edge detection operation on the one of the images to extract a plurality of edge features; and determining whether the edge features constitute the specific shape or not to obtain the candidate objects.

5. The path planning method as claimed in claim 3, wherein after the step of searching the specific shape to obtain the candidate objects in the one of the images, the path planning method further includes:

dividing the one of the images into a plurality of sub-image areas, wherein each of the sub-image areas is respectively associated with an orientation directed from the mobile robot;

calculating the amounts of the candidate objects located in each of the sub-image areas;

obtaining one of the sub-image areas corresponding to a most one of the amounts; and setting the orientation associated with the obtained sub-image area as a moving direction.

6. The path planning method as claimed in claim 5, further including:

controlling the mobile robot to move in the moving direction.

7. The path planning method as claimed in claim 3, wherein the step of estimating the distances respectively between each of the candidate objects and the mobile robot includes:

estimating the distances respectively between each of the candidate objects and the mobile robot according to sizes of each of the candidate objects in the one of the images.

8. The path planning method as claimed in claim 3, wherein the specific shape is in form of a circle, and the step of estimating the distances respectively between each of the candidate objects and the mobile robot includes:

estimating the distances respectively between each of the candidate objects and the mobile robot according to radii of each of the candidate objects in the one of the images.

9. The path planning method as claimed in claim 3, wherein after the step of selecting the candidate objects situated at the distances less than or equal to the first threshold as the target objects in the one of the images, the path planning method further includes:

obtaining current positions of each of the target objects in a latest one of the captured images and corresponding previous positions in one of the captured images previous to the latest one of the captured images; and deleting the target objects having displacements, which are the distances between the current positions and the corresponding previous positions, greater than a second threshold.

10. The path planning method as claimed in claim 3, wherein the target objects coincide with a specific color, and after the step of selecting the candidate objects situated at the distances less than or equal to the first threshold as the target objects in the one of the images, the path planning method further includes:

obtaining colors of each of the target objects; and deleting the target objects having the colors, which do not coincide with the specific color.

11. The path planning method as claimed in claim 1, wherein the step of planning the manipulating order according to the distances respectively estimated between the target objects and the mobile robot in the one of the images includes:

determining whether a new target object appears in a latest one of the captured images or not at every predetermined period; and rearranging the manipulating order according to the distance between the new target object and the mobile robot if the new target object appears.

12. The path planning method as claimed in claim 1, wherein when the mobile robot moves in the periphery area, the path planning method further includes:

detecting environment information by use of an ultrasonic sensing apparatus; and controlling the mobile robot to move along a border in the space, and keeping the mobile robot a predetermined distance away from the border according to the environment information.

13. The path planning method as claimed in claim 1 further including:

obtaining a plurality of edge features in the one of the images;

determining that static obstacles exist in positions of each of the edge features when each of the edge features constitutes a straight line having a slope of 90 degrees or substantially 90 degrees; and controlling the mobile robot to avoid the static obstacles when the mobile robot moves.

14. The path planning method as claimed in claim 1 further including:

estimating a moving velocity of an object according to a position of the object in a latest one of the captured images and a position of the object in one of the captured images previous to the latest one of the captured images;

determining that the object is a dynamic obstacle when the moving velocity is greater than a third threshold; and controlling the mobile robot to avoid the dynamic obstacle when the mobile robot approaches to the dynamic obstacle.

15. The path planning method as claimed in claim 1, wherein when the mobile robot moves in the periphery area, the path planning method further includes:

controlling the mobile robot to move toward a border then along the border, and keeping the mobile robot a predetermined distance away from the border when the mobile robot moves in the periphery area and deviates a distance greater than a fourth threshold from the border in the space, wherein the fourth threshold is greater than the predetermined distance.

16. A mobile robot comprising:

a driving apparatus steering the mobile robot to move;

an image capturing apparatus successively acquiring images when the mobile robot moves;

a target object manipulating apparatus managing a plurality of target objects in a space, wherein the space consists of a periphery area and a central area; and a control module coupled to the image capturing apparatus, the driving apparatus, and the target object manipulating apparatus, wherein the control module defines an initial position, enables the driving apparatus to steer the mobile robot to move from the initial position in the periphery area, obtains a latest one of the images acquired by the image capturing apparatus, plans a manipulating order according to distances respectively estimated between the target objects and the mobile robot in the one of the images, enables the driving apparatus to steer the mobile robot to move according to the manipulating order, and activates the target object manipulating apparatus to perform a manipulating action on the target objects in the one of the images, wherein the manipulating action is approaching and collecting one of the target objects, wherein the control module repeats the procedures of obtaining the one of the images, planning the manipulating order, and activating the target object manipulating apparatus to perform the manipulating action until the mobile robot returns to the initial position, wherein after the mobile robot returns to the initial position, the control module enables the driving apparatus to steer the mobile robot to move to the central area and activates the target object manipulating apparatus to perform the manipulating action on the target objects in the central area.

17. The mobile robot as claimed in claim 16, wherein the control module divides the central area into a plurality of sub-areas after the mobile robot returns to the initial position, defines a traversal order of visiting the sub-areas, enables the driving apparatus to steer the mobile robot to move into one of the sub-areas according to the traversal order, obtains a latest one of the images acquired by the image capturing apparatus in the one of the sub-areas, plans the manipulating order according to the distances respectively estimated between the target objects and the mobile robot in the one of the images, enables the driving apparatus to steer the mobile robot to move according to the traversal order, and activates the target object manipulating apparatus to perform the manipulating action on the target objects in the one of the images, and the control module repeats the procedures of enabling the driving apparatus to steer the mobile robot to move into the one of the sub-areas, obtaining the one of the images, planning the manipulating order, and activating the target object manipulating apparatus to perform the manipulating action until the mobile robot has passed through each of the sub-areas.

18. The mobile robot as claimed in claim 16, wherein the target objects are in form of a specific shape, and the control module searches the specific shape to obtain at least one candidate object in the one of the images, estimates the distances respectively between each of the candidate objects and the mobile robot, selects the candidate objects situated at the distances less than or equal to a first threshold as the target objects in the one of the images, and plans the target objects situated at the shorter distances from the mobile robot to have prior orders when planning the manipulating order of managing the target objects.

19. The mobile robot as claimed in claim 18, wherein the control module performs an edge detection operation on the one of the images to extract a plurality of edge features and determines whether the edge features constitute the specific shape or not to obtain the candidate objects.

20. The mobile robot as claimed in claim 18, wherein the control module divides the one of the images into a plurality of sub-image areas, wherein each of the sub-image areas is respectively associated with an orientation directed from the mobile robot, and the control module calculates the amounts of the candidate objects located in each of the sub-image areas, obtains one of the sub-image areas covering a most one of the amounts, and sets the orientation associated with the obtained sub-image area as a moving direction.

21. The mobile robot as claimed in claim 18, wherein the control module enables the driving apparatus to steer the mobile robot to move in the moving direction.

22. The mobile robot as claimed in claim 18, wherein the control module estimates the distances respectively between each of the candidate objects and the mobile robot according to sizes of each of the candidate objects in the one of the images.

23. The mobile robot as claimed in claim 18, wherein the specific shape is in form of a circle, and the control module estimates the distances respectively between each of the candidate objects and the mobile robot according to radii of each of the candidate objects in the one of the images.

24. The mobile robot as claimed in claim 18, wherein the control module obtains current positions of each of the target objects in a latest one of the captured images and corresponding previous positions in one of the captured images previous to the latest one of the captured images, and deletes the target objects having displacements, which are the distances between the current positions and the corresponding previous positions, greater than a second threshold.

25. The mobile robot as claimed in claim 18, wherein the target objects coincide with a specific color, and the control module obtains the colors of each of the target objects and deletes the target objects having the colors, which do not coincide with the specific color.

26. The mobile robot as claimed in claim 16, wherein the control module determines whether a new target object appears in a latest one of the captured images or not at every predetermined period, and if the new target object appears, the control module rearranges the manipulating order according to the distance between the new target object and the mobile robot.

27. The mobile robot as claimed in claim 16 further including:
an ultrasonic sensing apparatus coupled to the control module to detect environment information,
wherein the control module enables the driving apparatus to steer the mobile robot to move along a border in the space and keep the mobile robot a predetermined distance away from the border according to the environment information.

28. The mobile robot as claimed in claim 16, wherein the control module obtains a plurality of edge features in the one of the images, determines that static obstacles exist in positions of each of the edge features that constitute a straight line having a slope of 90 degrees or substantially 90 degrees, and enables the driving apparatus to steer the mobile robot to avoid the static obstacles when the driving apparatus steers the mobile robot.

29. The mobile robot as claimed in claim 16, wherein the control module estimates a moving velocity of an object according to a position of the object in a latest one of the captured images and a position of the object in one of the captured images previous to the latest one of the captured images, determines that the object is a dynamic obstacle when the moving velocity is greater than a third threshold, and enables the driving apparatus to steer the mobile robot to avoid the dynamic obstacle when the mobile robot approaches to the dynamic obstacle.

30. The mobile robot as claimed in claim 16, wherein the control module enables the driving apparatus to steer the mobile robot to move toward a border then along the border and keep the mobile robot a predetermined distance away from the border when the mobile robot moves in the periphery area, and deviates a distance greater than a fourth threshold from the border in the space, wherein the fourth threshold is greater than the predetermined distance.

31. The mobile robot as claimed in claim 16 further including:
a body comprising a chamber and an outlet, wherein the outlet is linked to the chamber.

32. The mobile robot as claimed in claim 31, wherein the driving apparatus comprises a first wheel set and a second wheel set, an axis of the first wheel set is fixed in the body and rotates back and forth about a first axis as an axle center, and an axis of the second wheel set is fixed in the body and rotates left and right about a second axis as an axle center, wherein the first axis and the second axis are substantially perpendicular to each other.

33. The mobile robot as claimed in claim 32, wherein the first wheel set comprises a first wheel and a second wheel and drives the mobile robot to move in a straight line, and the first wheel and the second wheel are parallel to each other and rotate about the first axis as the axle center.

34. The mobile robot as claimed in claim 32, wherein the second wheel set is a directional wheel, an axis of the directional wheel is fixed in the body through a connector, and the directional wheel rotates left and right about the second axis as the axle center to drive the mobile robot to turn.

35. The mobile robot as claimed in claim 32, wherein the target object manipulating apparatus comprises a third wheel, an axis of the third wheel is fixed in the body, and the third wheel has a plurality of fans stretching in a radial direction of a third axis.

36. The mobile robot as claimed in claim 35, wherein the body further comprises a guiding component, and the guiding component covers a part of the third wheel.

37. The mobile robot as claimed in claim 35, wherein the target object manipulating apparatus conducts the target objects through the guiding component to the chamber by virtue of the fans turned with the third wheel when manipulating the target objects.

38. The mobile robot as claimed in claim 35, wherein the first wheel set is located between the third wheel and the second wheel set, and the second wheel set is located between the first wheel set and the outlet.

39. The mobile robot as claimed in claim 38, wherein the radii of the first wheel and the second wheel in the first wheel set are greater than the radius of the directional wheel in the second wheel set.

* * * * *